United States Patent

Varian

[11] Patent Number: 5,710,673
[45] Date of Patent: Jan. 20, 1998

[54] AZIMUTH RECORD HEAD FOR MINIMIZING AND EQUALIZING CROSSTALK BETWEEN TRACKS OF OPPOSITE AZIMUTHS

[75] Inventor: George R. Varian, Palo Alto, Calif.

[73] Assignee: Ampex Corporation, Redwood City, Calif.

[21] Appl. No.: 660,355

[22] Filed: Jun. 7, 1996

[51] Int. Cl.$^6$ .................................................. G11B 5/02
[52] U.S. Cl. ................................................. 360/21; 360/125
[58] Field of Search ........................................ 360/110, 119, 360/75, 21, 18, 77.01, 77.02, 125, 126, 127

[56] References Cited

U.S. PATENT DOCUMENTS

| | | | |
|---|---|---|---|
| 5,296,979 | 3/1994 | Kawabe et al. | 360/125 |
| 5,442,451 | 8/1995 | Hitotsumachi | 360/21 |
| 5,495,375 | 2/1996 | McNeil et al. | 360/125 |

*Primary Examiner*—Nabil Hindi
*Attorney, Agent, or Firm*—John G. Mesaros; James M. Thomson; George B. Almeida

[57] ABSTRACT

In an azimuth recording format, the crosstalk of the A channel into the B channel is higher than the crosstalk of the B channel into the A channel because, at the ends of a magnetic recording where the switching contour of constant magnetic field strength is equal to the media magnetization switching field, the switching contour follows a curve. The resulting curvature at the ends of the magnetic recording vary accordingly the angle of azimuth rejection between the B to A azimuth relative to the A to B azimuth at the edges of the track. The use of a record head of a unique design wherein the trailing pole face of the head extends laterally beyond its leading pole face at the over-writing side of the head, removes the curvature at the ends of the transition recordings forming the recorded tracks. In such record heads, the switching contour generated at the trailing pole face of the gap at the over-writing side of the head enters and exits the trailing core generally normal to the pole face and at points thereon which are spaced beyond the corresponding end of the leading core face. Thus, no curvature is generated at the end of the recordings which perform over-writing of the previous adjacent tracks recorded in the media. Thus, the record heads show the same minimized level of crosstalk between the A to B or the B to A azimuth channels.

17 Claims, 3 Drawing Sheets

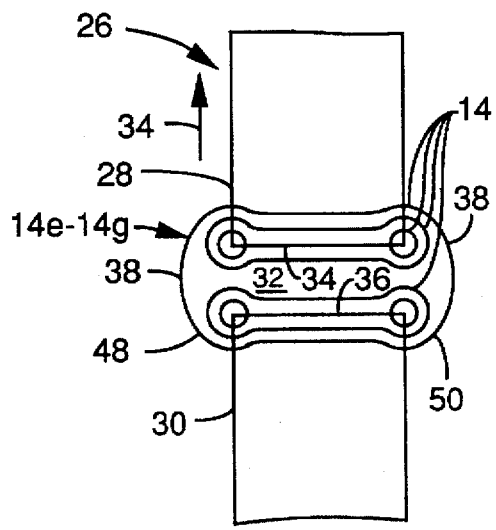
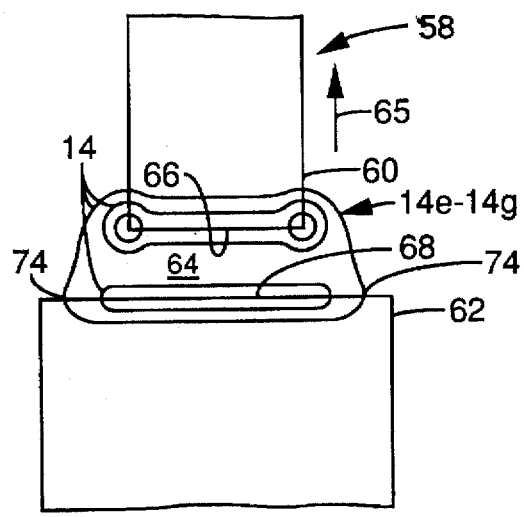
FIG. 2A
(PRIOR ART)
FIG. 3A
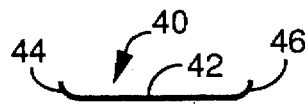
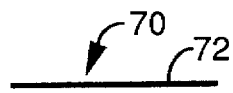
FIG. 2B
(PRIOR ART)
FIG. 3B
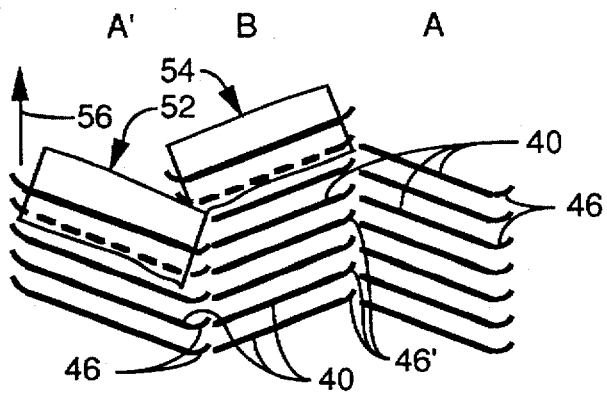
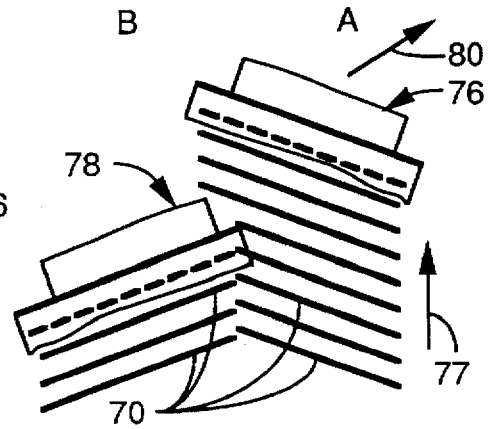
FIG. 2C
(PRIOR ART)
FIG. 3C

AZIMUTH RECORD HEAD FOR MINIMIZING AND EQUALIZING CROSSTALK BETWEEN TRACKS OF OPPOSITE AZIMUTHS

U.S. patent application Ser. No. 08/538,713, for Expanded Width Record Head which also Provides an Erase Function, by George R. Varian is related to the above-identified patent application.

BACKGROUND OF THE INVENTION

The invention relates to record heads for an azimuth recording format and, more particularly, to a record head having an over-writing side configuration and a specific head orientation relative to the over-writing side and relative to the direction of record head movement during the recording process.

In a magnetic record head the contours of constant magnetic field strength of a magnetic field generated above the surface of the head's transducing gap in a plane parallel to the magnetic media's surface, must be closed. It follows that the magnetic field at the outermost ends of the transducing gap bulge outwardly due to the lower reluctance, thereby defining curved contours of constant magnetic field strength at either end of the gap in the region of the adjacent media. Depending upon the magnetic characteristics of the media, the head-to-media spacing, the signal bandwidth, etc., the magnetic recording impressed in the media is determined by the magnetic field of a respective constant field strength contour. That is, the recording in the media is generated at a specific contour whose constant field strength equals the field required to switch the magnetic particles in an adjacent magnetic media. In a typical record head, at the extremities or ends of the transducing gap, the contour of constant field strength which is equal to the field required to switch the magnetic media also bulges outwardly from the gap ends at the depth in the media where recording is occurring, to thereby define a curved constant field strength contour at the gap ends. Thus, the polarity of the field at the switching contour, along the straight trailing edge of the gap and the curved portions of the gap's ends, remains as the magnetization in the media as the media passes the head. As a result, the respective ends of the recorded lines defining a recorded track correspond in shape to the field curvature at the switching contour of constant field strength, that is, similarly are curved at their ends when recorded in the media.

As well known in the art, in an azimuth recording format, complimentary pairs of record heads are oriented with their transducing gaps tilted at respective angles relative to the direction of head movement to provide tracks of recorded data with alternate azimuths, that is, recordings in azimuth A alternating with azimuth B. Similarly, the read heads for playing back such an alternate azimuth recording format also are oriented at alternate azimuths A and B matching those of the record heads. Such an azimuth recording format allows successive adjacent tracks to be recorded and played back without need for track isolating guard bands between the tracks, which in turn increases data packing densities while circumventing crosstalk problems. It follows that the alternating azimuths define an angle of azimuth rejection between them, whereby a playback head of azimuth A readily reads a recording of azimuth A but rejects the recording of azimuth B due to the angle of azimuth rejection. The same is true for the playback head of azimuth B relative to recordings of B and A azimuths. Thus, it generally has been accepted that signal crosstalk between channels of A to B and B to A azimuths is minimal and equal.

However, it has been found that the relationship between the channels concerning the angle of azimuth rejection is complicated by the curved contours of constant field strength at the ends of the gap previously discussed above. That is, the curved field contours at the ends of the gap, which cause associated curved ends in the recorded data along the track edges, unequally affects the angle of azimuth rejection between the A to B channels relative to the B to A channels.

To illustrate, the B azimuth head generates a recording wherein the curvature at the end bends away from the azimuth direction recorded by the previous adjacent A azimuth head. This in turn increases the angle between the B to A track azimuths, that is, increases the angle of azimuth rejection thereby decreasing signal crosstalk. On the other hand, the A azimuth head generates a recording where the curvature at the end bends toward the azimuth direction of the recording made by the previous adjacent B azimuth head. This decreases the angle of azimuth rejection at the abutting ends of the A to B track azimuths thereby increasing the signal crosstalk.

As is typical in azimuth recording formats, a subsequent adjacent record head of opposite azimuth overwrites the adjacent edge of the previous track, which thus erases the respective end curvatures of the previously recorded tracks. However, the gap ends of the track edges which overwrite the previous track edge also are curved, whereby the recorded tracks have azimuth ends which alternately bend towards and away from the respective adjacent azimuths.

This asymmetrical relationship between successive tracks of alternate azimuths causes serious problems, particularly as the tracks are made narrower as in future high density recording schemes. In a narrower track format, the track's end curvatures comprise a greater percentage of the recording whereby, for example, a B azimuth read head (which generally is slightly wider than the recorded track), will "see" the end curvature of the adjacent A azimuth track. Even if the read head is the same width as the recorded track, the tracking accuracy is such that the read head generally still will see the adjacent track ends. Thus, the crosstalk of the A channel into the B channel is higher than the crosstalk of the B channel into the A channel, whereby the B channel does not perform as well as the A channel. Accordingly, the error rates are higher when reproducing the B channel of data than when reproducing the A channel of data in digital recorder/reproducer apparatus employing azimuth recording formats.

It would be highly desirable and a decided advantage to equalize, while minimizing, crosstalk in digital recorder/reproducers employing azimuth recording formats.

SUMMARY OF THE INVENTION

The present invention circumvents the problems of previous discussion by equalizing the crosstalk between A and B channels of an azimuth recording while minimizing crosstalk in general. This provides the further advantages of improved efficiency in recording and reproducing digital data not only in present apparatus, but also in future higher density apparatus employing very narrow heads and respective narrow tracks.

To this end, the invention contemplates several embodiments each of which employs the basic concept that a recording contour of constant magnetic field strength generated by the trailing pole face of the over-writing side of the record head of the invention extends in a straight configuration laterally beyond the confronting leading pole face, regardless of the relative widths of the confronting pole faces.

In one embodiment, the invention employs a "single finger" record head, that is, a head whose gap is formed by a single narrow raised land or pole face in one core or pole piece confronting a relatively wider core pole face or pole piece. In addition, the record head is oriented such that, in this single finger embodiment, the narrower pole face defines the leading edge of the transducing gap while the opposite relatively wider pole face defines the trailing edge of the gap. Near the edges of the track, the maximum constant magnetic field strength occurs along the face of the trailing core edge or pole face, particularly in the region of the over-writing portion of the trailing pole face. Since the trailing core edge is straight, the transitions recorded in the magnetic media by the trailing pole face likewise are straight. That is, at the extended core face corresponding to the trailing gap extremity, the previously discussed field curvatures at the gap ends of the contour doing the recording do not exist. Thus, the recording impressed in the magnetic media no longer includes curved ends at the over-writing edges of each recorded track but defines instead essentially the straight ends of the recorded transitions. Not only is crosstalk between the A and B azimuth channels minimized, but any crosstalk between channels is equalized, whereby both channels A and B perform equally well.

In alternative embodiments of the invention, the extremity of the trailing core edge or pole face, at the side of the head opposite to the over-writing side, does not extend beyond the confronting leading core edge or pole face. That is, the edge of the trailing pole face at the opposite or non-over-writing side of the head may lie in register with, or may not extend laterally as far as, the confronting edge of the leading pole face. Accordingly, although the present invention generally is described initially herein with particular reference to a single finger head configuration, it is to be understood that head configurations resembling a dual finger structure and modified dual finger structure are equally contemplated as alternative configurations of the invention. The alternative embodiments also are fully described hereinbelow. As previously mentioned, a primary feature of the invention is that the recording magnetic contour generated by the trailing pole face on the over-writing side of the record head extends laterally in a straight line beyond the confronting leading pole face.

BRIEF DESCRIPTION OF THE DRAWINGS

FIG. 2A is a simplified top view depicting a gap portion of a typical dual finger record head, generating curved contours of constant magnetic field strength.

FIG. 2B is a simplified view of a single magnetic recording made by the typical record head of FIG. 2A, depicting the curved ends impressed in the magnetic media at the edges of an associated track.

FIG. 2C is a top view of a fragment of an azimuth recording format in a magnetic media generated by the typical record head of FIG. 2A and corresponding to the curved end recording of FIG. 2B, also depicting the over-writing of a previous track edge by the next track.

FIG. 3A is a simplified top view depicting a gap portion of a single finger record head of the invention, generating straight contours of constant magnetic field strength at both sides of the head, and including the direction of head movement.

FIG. 3B is a simplified view of a single magnetic recording made by the record head of FIG. 3A, depicting the lack of curved gap ends.

FIG. 3C is a top view of a fragment of an azimuth recording format in a magnetic media generated by the invention record head of FIG. A and corresponding to the straight line recording of FIG. 3B.

DETAILED DESCRIPTION OF THE EMBODIMENTS

Figure 1:
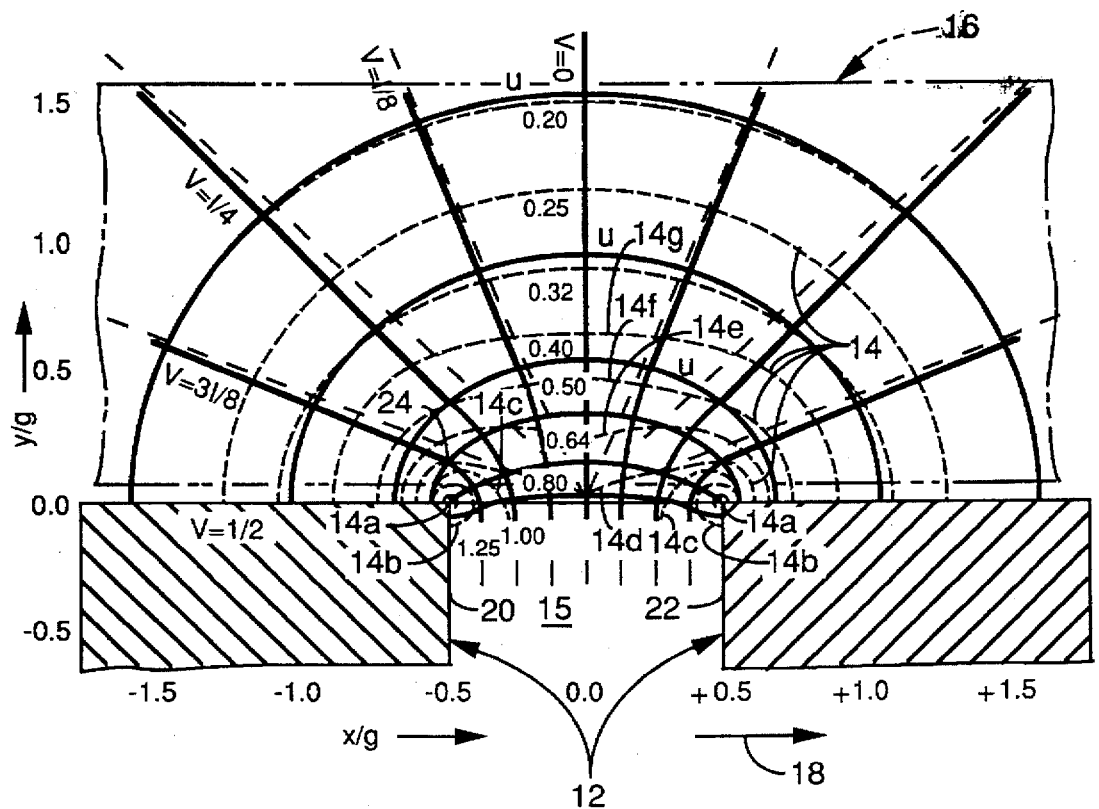
FIG. 1 is a plan view of a tape bearing portion of a magnetic head illustrating the equipotentials, the flux lines and the contours of constant field strength generated in the transducing gap region of the head.

By way of explanation, FIG. 1 is a plan view of a portion of a transducing gap 15 of a magnetic head 12 depicting the equipotentials (solid lines), flux lines (dashed lines) and contours of constant field strength (dotted lines) for conformal map solution to the finite gap head 12. The figure is taken from the publication "Theory of Magnetic Recording" by Neal Bertram, Cambridge University Press, chapter 3, page 69, which subject matter is specifically incorporated herein by reference. The associated graph illustrates the constant potentials V and flux lines U, as well as contours 14 of constant field strength at the surface of the head in the region of a magnetic media being transported past the gap 15 of the head. By way of example only, a fragment of a media 16 is illustrated with the head being moved in a direction 18 relative to the media. Thus, the left core edge is a trailing gap edge 20 and the right core edge is a leading gap edge 22. As may be seen, near the gap 15, flux lines U that give the field direction do not coincide with the contours 14 of constant field strength. For example, at a point 24 a field strength contour 14d is parallel with the x-axis while the field direction U is approximately at 60 degrees to the x-axis. Further from the gap 15, the field contours 14 are generally circular and the field direction is along contours of constant strength. At the gap corners at the surface of the head, a contour 14a is the strongest and, along with other contours 14b, 14c most adjacent to the corners, define paths only in the regions of the respective gap edges 20,22. Contours progressively further from the gap edges decrease in constant field strength and, as depicted by contours 14d, 14e, 14f, etc., define paths which encompass both the trailing and leading edges 20,22 of the head.

It may be seen that contour 14d (as well as 14e) extends further into the media (see point 24) at the gap edges than it does at the center of the gap length where, for example, the contour 14d dips towards the head surface. Contours 14f and the following contours however extend their furthest into the media in the region of the center or mid gap. Thus the region of maximum field follows along the gap edges to the ends of the gap, and past the ends of the gap the maximum field moves to the middle of the gap length.

In the example of FIG. 1, the strongest contours 14a–14c do not affect the magnetization in the media 16 since they do not penetrate into the media. The contours 14c–14g are those most likely to be properly oriented, of sufficient depth and of a constant field strength equal to the field strength required to switch the magnetization in the media 16. These contours of switching strength extend across the transducing gap and past the facing edges or pole pieces to thereby encompass both the trailing and leading gap edges 20, 22.

The contours 14 of the plan view of FIG. 1 are in a vertical orientation. However, equivalent contours 14 may be illustrated in a horizontal orientation, that is, in a top view of the head 12 of FIG. 1. To this end, FIG. 2A is a top view of, for example, a portion of a conventional record head 26, including a pair of confronting magnetic material pole pieces or cores 28,30 which define therebetween a magnetic transducing gap 32. The gap includes a leading pole face 34 formed of a facing edge of the core 28 and a trailing pole face 36 formed of a facing edge of the core 30, corresponding to movement of the head in the direction shown by an arrow 34. As generally known in the art, the trailing edge of a record head provides the actual recording in a media. The facing pole faces of the cores or pole pieces are of equal narrow width and hereinafter may be alternatively termed "fingers". Hence, the head 26 is a "dual finger" record head.

FIG. 2A further depicts several approximate contours 14 of constant magnetic field strength corresponding generally to the contours 14 of FIG. 1. As previously discussed, the contours are generated by a typical record head at the recording surface of the head 26. It is assumed that the recording field at one of the depicted contours 14e–14g equals the field required to switch the magnetization in the adjacent magnetic media 16 (FIGS. 1 and 4). It may be seen that the path of the constant field strength contour in the media 16 where the record field is equal to the media switching field, follows an outwardly bulging curvature 38 at each end of the gap 32, that is, at the outside edges of the magnetic track. Referring in addition to FIG. 2B, it follows that the curvature 38 of the contour 14e–14g will switch the magnetization in the media 16 precisely along the curvature thereof at the trailing pole face 36 of the gap 32. Thus, a recording 40 defines a straight line 42 corresponding generally to the width of the gap, but further includes bent ends 44,46 whose curvatures correspond to the curvatures at points 48,50 respectively (FIG. 2A) of a contour 14e–14g generated by the trailing pole face 36 of the dual finger head 26.

FIG. 2C illustrates a fragment of successive tracks A, B, A' recorded in a magnetic media in a conventional digital azimuth recording format. The tracks A, B are formed of successive recordings 40 with A, A' and B azimuth record heads (partially depicted at 52,54 respectively) recording the A and B tracks with alternate azimuths A and B. The A azimuth head leads the B azimuth head as they record in a direction 56, with the track A' subsequently following the track B on the next pass of the A azimuth head. As may be seen, the heads 52, 54 are wider than the width of the resulting recorded tracks and each subsequent pass of the record heads as they progress to the left of the page overwrites one edge of the previous adjacent track of the opposite azimuth in conventional fashion. That is, since successive head passes proceed to the left, the right side of the record head 26 is used to overlap, and thus over-write, a portion of the adjacent edge of the previous track. This side of the head thus is termed herein the "over-writing side" of the azimuth record head. This action erases the corresponding adjacent bent ends 44 of the previous recordings 40. However, the corresponding bent ends 46' and 46 of the head doing the overwriting remain recorded in the media.

The resulting azimuth recording includes, for example, a track A whose right hand edge includes recordings with bent ends 46 and a track A' with recordings with bent ends 46. Note that the bent ends of tracks A and A' curve towards the direction of the B azimuth.

On the other hand, the track B includes recordings with bent ends 46' which overwrite the bent ends 44 of the track A and which remain recorded in the magnetic media. Note however that the bent ends 46' of track B curve in a direction away from the direction of the A azimuth. Thus, the angle of azimuth rejection between the edge of the track B relative to the edge of the previous track A is greater than the angle of azimuth rejection between the track A or A' relative to the previous track B. Thus, in the course of reading out the media, as previously discussed, the crosstalk of the A or A' channel into the B channel when the track B is read, is greater than that of the B channel into the A channel when the track A or A' is read, which is an undesirable condition.

Referring now to FIG. 3A, there is shown a simplified structure illustrating an embodiment of the invention, for overcoming the previously mentioned problems associated with the generation of magnetic field curvatures at the edges of tracks recorded in a magnetic media. In this particular embodiment, the invention includes a "single finger" record head 58 including a pair of confronting magnetic material cores 60,62 which define therebetween, primarily due to the width of the core 60, a magnetic transducing gap 64. The orientation of the head and thus of the gap 64 relative to a direction 65 of head movement, determines a gap leading pole face 66 formed of a facing edge of the core 60, and a gap trailing pole face 68 formed of a confronting portion of a facing edge of the core 62. The width of the facing pole face 66 of core 60 generally defines the width of the recorded tracks. The width of the facing edge of the core 62 is greater than the width of the facing edge of the core 60 and, in accordance with this embodiment of the invention, the head is oriented such that the trailing pole face 68 of the gap 64 corresponds to the wider core. Since the head of FIG. 3A has only one "finger" it is termed herein as a "single finger" record head.

By way of example only, the overall width of the head 58 and thus of the core 62 may be about 100 to 125 micrometers (μm) while the width of the core 60 may be about 40 μm. The gap length may be about 0.5 μm and the recorded track width may be about 20 m. The fabrication of the head is facilitated by making the core 62 the width of the head, since only the core 60 needs to be formed into the narrower finger configuration. However, it is to be understood that the technique of this embodiment of the invention is satisfied equally well by a core 62 whose width is at least a gap length wider than the core 60. Preferably, the core 62 is wider than core 60 by an amount greater than two gap lengths. An example of a single finger head and the method for fabricating same is found in a copending U.S. patent application Ser. No. 08/287,459 filed Aug. 8, 1994, to B. R. Gooch, et al., and assigned to the same assignee as this application. The specification and drawings of this application are specifically incorporated herein by reference.

Figure 6:
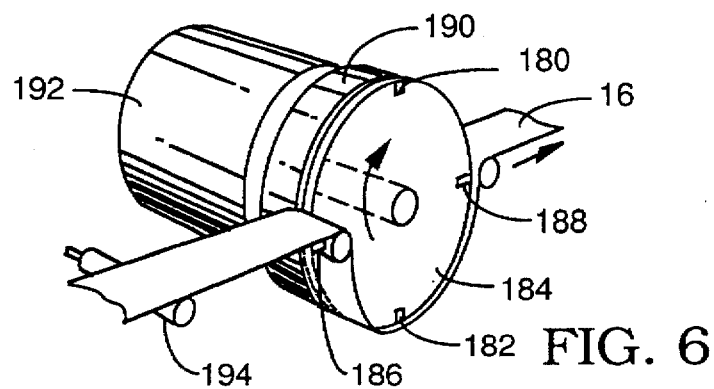
FIG. 6 is a simplified perspective view depicting a typical helical record/reproduce apparatus for moving a magnetic media relative to the magnetic head of, for example, FIGS. 3A, 4A or 5A.

FIG. 3A further depicts several approximate contours 14 of constant magnetic field strengths, which are the equivalent to the contours 14 of FIGS. 1, 2A, but which are generated by the record head 58 at the recording surface of the head and thus are modified in accordance with the invention. The recording field at one of the contours 14e–14g equals the field required to switch the magnetization in the adjacent magnetic media 16 (FIGS. 1, 6). It may be seen that the contour of constant field strength, where it is equal to the media switching field, follows the trailing pole face 68 of the gap 64 and is therefore essentially straight. Thus, unlike the switching contours of the prior art record head 26 of FIG. 2A, the switching contour of the invention record head 58 of FIG. 3A does not generate bent ends at the ends of an associated transition recording, particularly at the over-writing side of the record head.

To illustrate further, in accordance with this embodiment of the invention, FIG. 3B depicts a transition recording 70 formed of a straight line 72 corresponding generally to the width of the core 58, that is, the width of the gap 64. Because gap 64. Because of the expanded facing dimension embodiment, the contour generated by the head 58 enters and exits the core 62 generally normal to the surface of the trailing pole face 68 of the core 62, and extends along a straight line corresponding to the trailing pole face 68. This head configuration forces the switching contour 14e-14g to have an expanded width relative to the width of the core 60 at the over-writing side of the head, whereby the gap's trailing edge, which performs the recording, likewise is widened at the over-writing side. Thus the maximum field follows the expanded straight width of the trailing edge 68 and never moves into the middle of the gap length. No curvature is generated at the ends of the recording 70, since there is no outwardly bulging curvature (38 of FIG. 2A) in the switching contour at the points 74 where the contour meets the trailing pole face of the core 62 at the recording surface of the head.

FIG. 3C illustrates a fragment of successive tracks A, B recorded in a magnetic media in a digital azimuth recording format in accordance with the invention. The tracks A, B are formed of successive recordings 70 with A and B azimuth record heads (partially depicted at 76, 78 respectively) recording the A and B tracks with alternate azimuths A and B. The A azimuth head leads the B azimuth head as they record in the direction 77, with successive head passes proceeding to the left as in FIG. 2C. Thus, the extended trailing pole face 68 at the lagging side (the right side in this example) of the record head 58 provides the overlap of the previous adjacent track and comprises thus the overwriting side of the record head 58. In a helical or transverse recording apparatus, the general media direction is illustrated via an arrow 80.

Figure 4A:
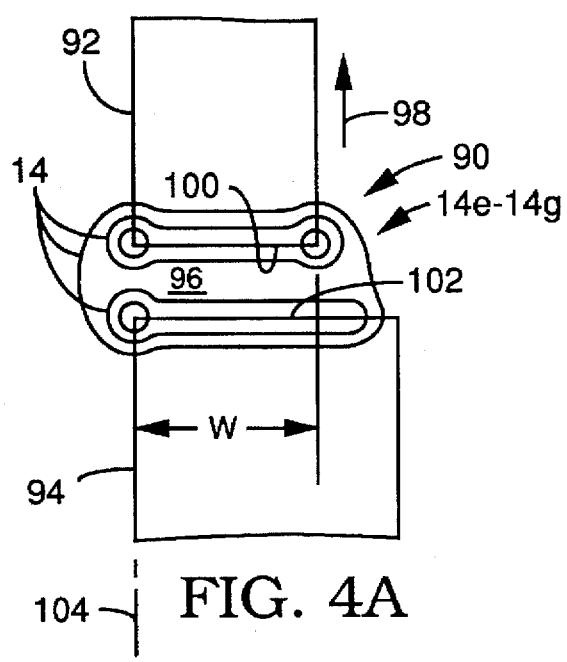
FIGS. 4A, 5A are simplified top views depicting gap portions of alternative embodiments of the record head of FIGS. 3A, 3C.

FIG. 4A depicts a simplified structure of an alternative embodiment of the invention record head configuration of FIG. 3A. More particularly, a record head 90 includes a pair of confronting magnetic material cores 92, 94 which define therebetween a magnetic transducing gap 96 when bonded together. In use, the head is oriented so as to move in a direction 98 such that a pole face 100 of the core 92 forms a leading pole face and a pole face 102 of the core 94 forms a trailing pole face. The width of the core 92 generally defines the width of the gap and recorded tracks. If the successive passes of the head 90 proceed to the left, as depicted in FIGS. 2C, 3C, it follows that the right or lagging side of the head performs the function of over-writing new data over the adjacent edges of the previous track.

Figure 4B:
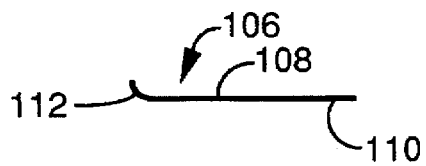
FIGS. 4B, 5B are simplified views of a single magnetic recording made by the record heads of FIGS. 4A, 5A, respectively.
Figure 4C:
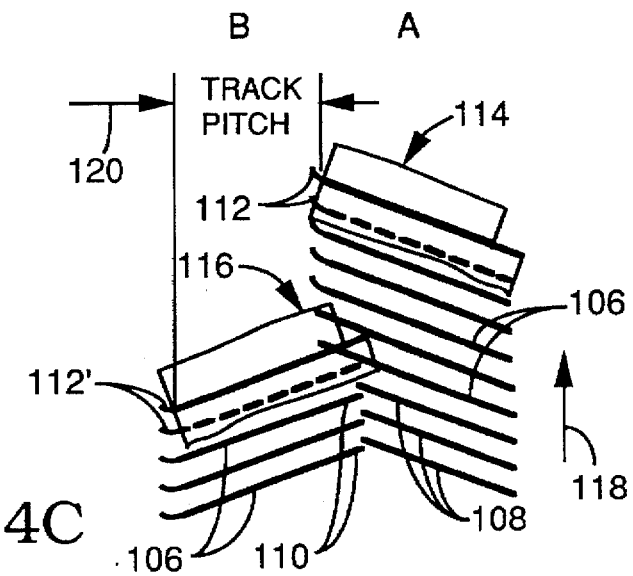
FIG. 4C is a top view of a fragment of an azimuth recording format in a magnetic media generated by the invention record heads of FIGS. 4A or 5A.

Unlike the head 58 of FIG. 3A, the confronting cores 92, 94 of the head 90 of FIG. 4A are not symmetrically centered, but instead the trailing core 94 maintains an offset towards the over-writing side of the head 90 and the trailing core 94 is of relatively smaller width than the trailing core 62 of FIG. 3A. Since over-writing of the previous adjacent track is performed only by the over-writing side of the head, the relative configuration of the pole faces 100, 102 at the side of the head opposite the over-writing side, that is, the non-over-writing side, is not critical since any track curvatures generated by this corresponding non-over-writing edge of the track will be over-written and thus removed by the next pass of the head of alternate azimuth. That is, the trailing pole face 102 need not extend laterally beyond the leading pole face 100 at the non-over-writing side as is necessary at the over-writing side of the head. The head 90 thus is depicted by way of example with the sides of the cores 92, 94 lying along a common plane 104, that is, generally are in register laterally. A condition to be met in such alternative embodiments employing trailing core widths that are only slightly wider, the same or even less than the leading core width, is that the width w of the transducing gap, that is, the recorded track width, is equal to or greater than the track pitch. Track pitch is the distance the head is moved laterally to record the next track, as shown in FIG. 4C.

FIG. 4A further depicts several approximate contours 14 of constant magnetic field strengths which are equivalent to those of FIGS. 1, 2A, 3A. The contours in the region of the over-writing side of head 90 are similar to those of the invention as depicted in FIG. 3A, while the contours at the opposite side of the head are similar to those of the prior art head of FIG. 2A. Thus, the contour of constant field strength in the region of the over-writing side follows the straight trailing pole face 102 and likewise is straight with no bent ends in the corresponding transition recordings in the region of the over-writing side. This is shown in FIG. 4B which illustrates a transition recording 106 generated by the modified record head 90 and formed of a straight portion 108 with a straight end 110 in the region of the over-writing side, and a bent end 112 at the opposite non-over-writing side of the head 90.

It follows that the bent ends 112 of a recorded track are over-written by the straight ends 110 of a record head 90 of alternate azimuth when the latter records a subsequent adjacent track. This action is depicted in FIG. 4C wherein A and B azimuth tracks are formed of successive recordings 106, with A and B azimuth heads similar to the head of FIG. 4A, partially depicted at 114, 116, respectively, doing the recording. As may be seen, as the heads 114, 116 record in a direction 118 and proceed to the left with each scan pass, the straight ends 110 of the over-writing side of each head overlap the bent ends 112 of the previous adjacent track to produce straight transition recordings as depicted at 108 of the A track. The track pitch corresponding to the distance that the heads are moved laterally for each head scan is depicted at 120. As previously discussed, the width w (FIG. 4A) of the transducing gap 96 should be equal to or greater than the track pitch 120.

Figure 5A:
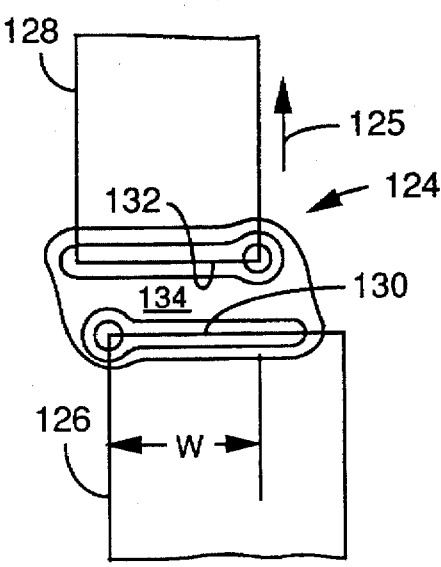

FIG. 5A illustrates a further modified structure of an alternative embodiment of the invention of FIGS. 3A, 4A. In particular, a modified record head 124 is depicted moving in a direction 125, wherein a trailing core 126 may be the same width, or may even be of narrower width, than a leading core 128. However, the trailing core 126 is arranged to maintain the offset laterally relative to the leading core 128 at the over-writing side of the record head 124, so that the transition recording generated by a trailing pole face 130 of core 126 extends laterally beyond a confronting leading pole face 132 of the core 128. A resulting transducing gap 134 is formed between the confronting portion of the faces 130, 132 to define a gap width w corresponding to the resulting recorded track width. The width w should be equal to or greater than the track pitch depicted in FIG. 4C.

Figure 5B:
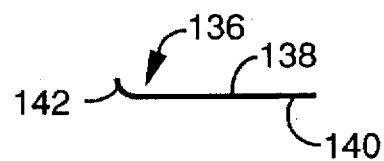

FIG. 5A depicts several approximate contours 14 of constant magnetic field strengths which are equivalent to those of FIGS. 1, 2A, 3A, 4A. As may be seen, the contours at the over-writing side of the record head 124 are similar to those of the invention of FIGS. 3A, 4A in that they follow the straight extended trailing pole face 130 to produce transition recordings 136 with a straight portion 138 and a straight end 140 at the over-writing side of the head 124 and thus at the over-writing end of the transition recording (FIG. 5B). Since the leading pole face 132 of core 128 extends beyond the trailing pole face 130 of core 126 at the non-over-writing side, the contours of constant magnetic field strengths are the inverse of the contours at the over-writing side of the head. It follows that the contour generating the recordings bulges outwardly at the non-over-writing side of the trailing pole face 130, and accordingly generates a bent end 142 on the transition recordings 136 in the manner of the prior art record heads of FIG. 2A. As previously discussed, this is not critical since the and thus removed by and thus removed by the next pass of an alternate azimuth record head, as depicted in FIG. 4C for the head 90.

FIG. 6 illustrates in simplified form by way of example only a helical scanning apparatus for generating a helically scanned azimuth recording format in a magnetic recording media 16. FIG. 6 depicts a pair of record heads 80, 82 similar to the single finger head 58 of FIG. 3A, or to the alternative record heads 90 or 124 of FIGS. 4A, 5A. The heads are mounted in an opposite azimuth configuration in a scanner head wheel 184 and are circumferentially spaced 180 degrees apart, with read heads 186, 188 spaced 90 degrees from the record heads. The record and read heads are precisely mounted in the scanner head wheel 184 by conventional head mounts which provide precision adjustments in the alignment of the heads as well as the rotation thereof to provide the several degrees of azimuth orientation. The magnetic media 16 is suitably wrapped about the head wheel 184 via a usual rotary scanner drum mechanism, shown in part at 190, whereby rotation of the head wheel 184 via a scanner motor 192 causes the record heads 180, 182 to record the tracks diagonally across the width of the magnetic media at a preselected angle relative to the length of the media. As described above, the single finger heads of FIG. 3A or the modified heads of FIGS. 4A, 5A are oriented relative to the direction of travel such that the trailing pole faces of the trailing cores on the over-writing side of the head, extend laterally beyond the respective leading pole faces of the leading cores. A capstan 194 is driven by a capstan motor (not shown) and provides the means for transporting the media relative to the drum mechanism 190 and head wheel 184. Although a media wrap angle of approximately 180 degrees is depicted in FIG. 6, other wrap angles or media orientation relative to the heads 180, 182, 186, 188 may be employed, as is well known in the art.

Although a helical scanning apparatus is illustrated for applying the invention concepts, it is to be understood that the invention is equally applicable with other recording/reproducing apparatus such as arcuate, transverse, etc., recording/reproducing apparatus as well as possible versions of longitudinal recording/reproducing apparatus.

While the invention has been described in the above embodiments, it is understood that further variations and modifications in form and details are contemplated without departing from the spirit and scope of the invention, as defined in the appended claims.

What is claimed is:

1. A record head for providing an azimuth recording format of magnetic tracks of a selected width in a magnetic media while generating minimized and equal crosstalk between the tracks upon subsequent readout of the tracks, wherein over-writing of a previous track is performed by an over-writing side of the head, comprising:
    a first magnetic material core having a first pole face of a preselected width formed therein;
    a second magnetic material core having a second pole face of a second preselected width formed therein;
    said first and second cores being bonded together with the faces thereof in generally confronting relation to define a magnetic gap of selected gap length therebetween, with the second pole face of the second core extending beyond the first pole face of the first core at said over-writing side; and
    said record head being oriented during the recording process with the second pole face of the second core trailing the first pole face of the first core.

2. The record head of claim 1 including:
    a contour of constant magnetic field strength generated between said confronting pole faces in the region of the magnetic gap, said contour extending generally along said trailing pole face beyond the end of said leading pole face at said over-writing side of the head.

3. The record head of claim 2 wherein the second core extends in width at said over-writing side a distance sufficient to generate the contour of constant magnetic field strength in a straight line along the extended trailing pole face.

4. The record head of claim 3 wherein the side of the second core relative to the corresponding side of the first core at the non-over-writing side, are generally in register or the leading pole face extends laterally beyond the trailing pole face.

5. The record head of claim 3 wherein the trailing pole face of the second core extends beyond the leading pole face of the first core by an amount greater than a gap length.

6. The record head of claim 5 wherein the head is moved transversely a distance equal to a track pitch after recording a track, wherein the trailing pole face has a width of at least a track pitch through a width of the leading pole face plus at least the gap length.

7. The record head of claim 2 including:
    transport means for moving the record head relative to the media with the record head oriented so that the second core trails the first core, and said over-writing side overlaps a previously recorded track on a subsequent adjacent track recording to define the track width.

8. A record head for providing an azimuth recording of magnetic tracks of a selected width and track pitch in a magnetic media while generating minimized and equal crosstalk between the recorded tracks upon their subsequent readout, the record head including a pair of bonded magnetic cores having a transducing gap of selected gap length formed therebetween by a first facing edge of preselected width in a first core in generally confronting relation with a second facing edge of second preselected width in a second core, comprising:
    means for orienting the record head relative to the magnetic media to cause an over-writing side of the head to overlap and thus over-write a portion of a previous track to generate the azimuth recording;
    said second core being laterally offset relative to said first core at said over-writing side of the head so that the second facing edge extends laterally beyond the end of the first facing edge a preselected distance at said over-writing side; and transport means for moving the record head relative to the media with the second facing edge trailing the first facing edge to provide the partially over-written recorded tracks in the media.

9. The record head of claim 8 including:

a contour of constant magnetic field strength generated within the transducing gap and extending generally in a straight line along the laterally extended second facing edge of the second core at the over-writing side.

10. The record head of claim 9 wherein:

said second facing edge extends beyond the end of the first facing edge of the first core at the over-writing side by an amount equal to at least a gap length.

11. The record head of claim 10 wherein:

said second facing edge of the second core, at the non-over-writing side, is in general register with the first facing edge or is shy of the first facing edge of the first core; and the confronting portions of the first and second facing edges forming the transducing gap have a width equal to or greater than the track pitch.

12. A method of providing an azimuth recording of magnetic tracks of selected track pitch in a magnetic media while generating minimized and equal crosstalk between the tracks upon their subsequent readout, utilizing a record head whose transducing gap is of a given gap length and is formed with a first facing edge of preselected width in generally confronting relation with a second facing edge of a second preselected width, comprising the steps of:

orienting the record head relative to the magnetic media to provide the azimuth recording, wherein an adjacent portion of a previously recorded track is over-written by an over-writing side of the head on a next head pass;

generating at the over-writing side of the head a generally straight switching contour of constant magnetic field strength extending at least a gap length beyond the first facing edge; and moving the record head relative to the magnetic media with the straight switching contour at the over-writing side of the head overlapping the adjacent portion of the previously recorded track, to provide the azimuth recording of recorded tracks in the media.

13. The method of claim 12 wherein the step of generating includes:

generating the generally straight switching contour of constant magnetic field strength along the second facing edge and extending at the overwriting side beyond the preselected width of the first facing edge said at least gap length.

14. The method of claim 13 wherein the width of the confronting portions of the first and second facing edges is at least as wide as the track pitch, and the step of moving includes recording successive adjacent tracks while overlapping with said straight switching contour at the overwriting side the previously recorded track to thus reduce the width of each previously recorded track.

15. The method of claim 13 wherein the second facing edge is the trailing edge of the transducing gap.

16. A method of recording an azimuth recording of recorded tracks of selected track pitch and of selected width in a magnetic media via a transducing gap of selected length while generating minimized and generally equal crosstalk between the tracks upon a subsequent readout process, comprising;

generating via the transducing gap a generally straight switching contour of constant magnetic field strength representing a bit of data;

generating at an over-writing side of the transducing gap an extension of the straight switching contour of at least the selected length of the gap; and successively recording the generally straight switching contour in the magnetic media with at least the extension of the straight switching contour overlapping and thus over-writing a portion of a previously recorded track to record successive substantially straight transition recordings defining said azimuth recording.

17. The method of claim 16 wherein said transducing gap is formed of a first facing edge of preselected width in generally confronting relation with a second facing edge of a second width, the method including;

generating the extension of the straight switching contour along the second facing edge the gap length beyond the first facing edge at the over-writing side of the gap; and moving the transducing gap relative to the magnetic media with the second facing edge trailing the first facing edge to over-write with the extension the adjacent edge of the previously recorded track.

* * * * *